March 8, 1960 G. D. RIVERS 2,927,985

PRINTED CIRCUIT RELAYS

Filed Dec. 9, 1957 2 Sheets-Sheet 1

INVENTOR
GEORGE D. RIVERS
BY Thomas S. Ross
ATTORNEYS

INVENTOR
GEORGE D. RIVERS
BY Thomas S. Rose
ATTORNEYS

United States Patent Office 2,927,985
Patented Mar. 8, 1960

2,927,985

PRINTED CIRCUIT RELAYS

George D. Rivers, Granby, Conn., assignor to Royal McBee Corporation, Port Chester, N.Y., a corporation of New York Application December 9, 1957, Serial No. 701,580

5 Claims. (Cl. 200—104)

This invention relates to electrical switching devices; more particularly it relates to a relay type switching device incorporating a plurality of isolated printed circuit conductors and a bi-position switching element which carries a plurality of transfer contacts for selectively connecting energized ones of said printed circuit conductors with one or more printed circuit conductors associated therewith.

At present the most widely used devices for controlling a plurality of circuits are clapper armature type relays in combination with leaf spring contacts. As is well known the clapper armature is pivotally mounted on a support and the leaf spring contact members are stacked on said support. Movement of the clapper armature causes movement of energized leaf spring contact members of the stack between two associated leaf spring contact members. Where large stack ups are required oversized coils must be employed to move all the leaf springs in the stack. Also where the rate of motion of the clapper armature is increased to decrease operating time, the increase in the rate of motion works against the leaf springs and produces increased tension working against the relay coil; again necessitating an oversized coil. It is apparent therefore, that the size of the contact stacks and hence the number of circuits which can be controlled is limited by considerations of coil size, power expenditure, and operating time. Further the leaf spring contacts in these clapper type relays tend to bounce with the result that the controlled circuits open and close several times before settling down to a steady state condition. Clapper type relays built to control a large number of circuits are therefor bulky, expensive and relatively slow operating.

In the present invention the disadvantages of prior art relay switching devices are overcome in the provision of a small compact construction incorporating a great number of circuits with means for controlling said circuits with a minimum expenditure of power. The basic construction comprises printed circuit conductors on a pair of facing printed circuit boards in combination with a bi-position element which carries a plurality of transfer contacts. The bi-position element is adapted to be moved between said pair of printed circuit boards to one or another of its two positions by an electromagnet and armature. Depending on which position the bi-position occupies, the transfer contacts carried thereby effect connections of energized printed circuit conductors on one of said boards with a first group or a second group of output printed circuit conductors on the other of said boards and vice versa.

In accordance with the invention the transfer contacts are compressed between the pair of printed circuit boards thereby eliminating any bounce and since armature motion is working against sliding friction between transfer contacts and printed circuits, the force required to move the bi-position element is constant with motion enabling a smaller, more economically operated electromagnet to be used. Further the speed of operation is a fraction of the time required by clapper armature type relays where a comparable number of circuits are controlled. It is possible with the instant invention therefore to increase the number of circuits which may be simultaneously controlled by a small, compact and economical unit.

It is an object of the invention therefore to provide a small, compact, low cost printed circuit relay switching device.

It is another object of the invention to provide a relay switching device having a high speed of operation wherein contact bounce is entirely eliminated.

Still another object of the invention is the provision of a relay switching device wherein an optimum number of circuits to be controlled may be incorporated in a small compact area.

A further object of the invention is the provision of a small, compact printed circuit relay switching device adapted to receive plug in terminal connectors.

A still further object of the invention is to provide a small compact printed circuit relay incorporating an optimum number of circuits which may be controlled with a minimum expenditure of power.

Other objects and many of the attendant advantages of the invention will be readily appreciated as the same becomes better understood by reference to the following detailed description when considered in connection with the accompanying drawings in which like reference numerals designate like parts throughout the figures thereof and wherein.

Figures 1, 2, 3:
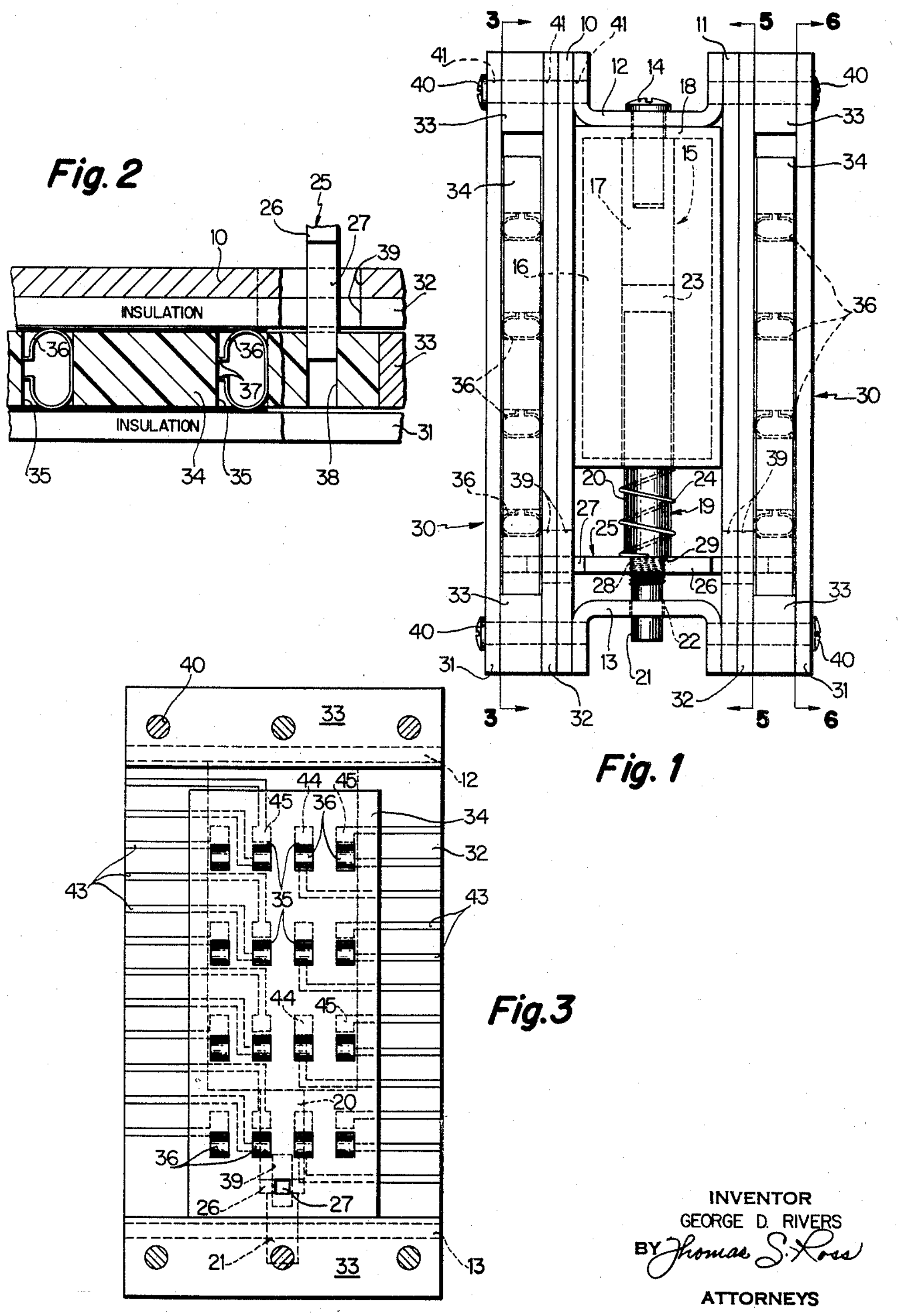
Fig. 1 is a side view of a relay switching unit assembled in accordance with the invention.
Fig. 2 is a fragmentary cross sectional view with parts broken away showing the transfer contacts mounted in the bi-position element and the mode of coupling between the electromagnet operated actuator and element.
Fig. 3 is a view taken along lines 3—3 of Fig. 1 showing the bi-position element in a home position.
Figures 4, 5:
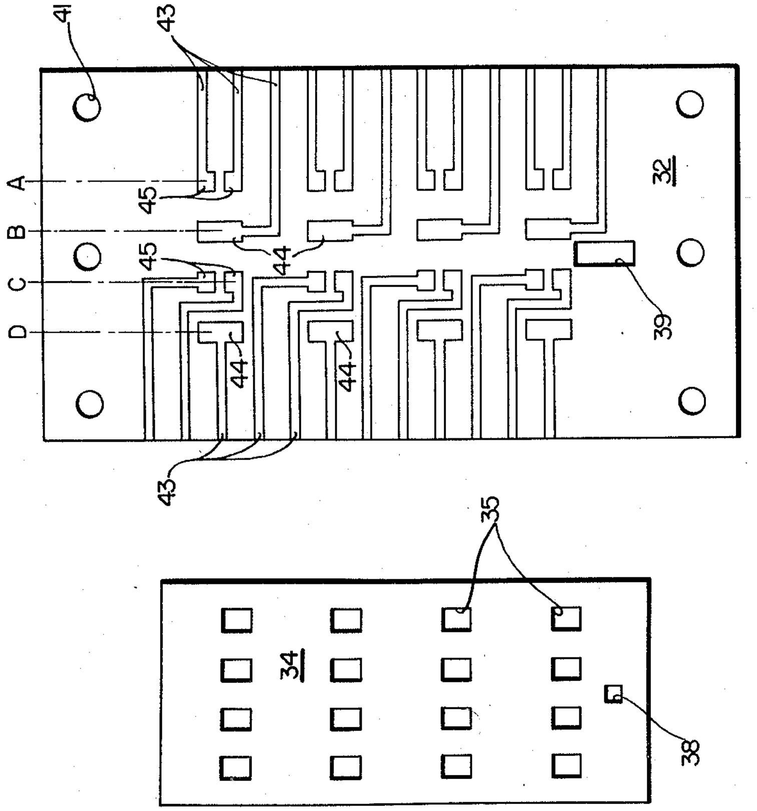
Fig. 4 is a plan view of a bi-position element.
Figure 6:
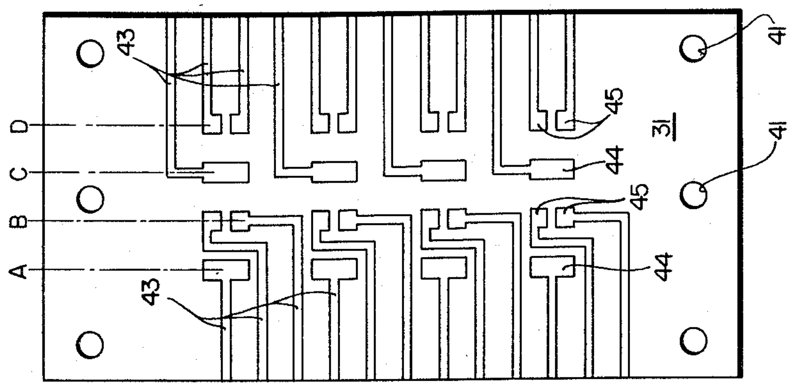

Figs. 5 and 6 are views of the printed circuit boards taken along lines 5—5 and 6—6 of Fig. 1 showing the cooperating printed circuit conductor patterns.

Referring now to the drawings wherein like reference numerals designate like or corresponding parts throughout the several views there is shown in Fig. 1 the general organization of a unit in accordance with the invention. The unit comprises a pair of parallel rectangular mounting plates 10 and 11 respectively, spaced apart by two U-shaped rectangular saddle members 12 and 13. The upper saddle member 12 is provided with a centrally located hole adapted to receive a bolt 14 whereby an encased electromagnet assembly, generally designated by reference numeral 15, may be secured in the space between the parallel plates. The electromagnet may be any conventional type comprising a coil 16 wound on an insulating spool and a pole piece 17 press fitted into the axial bore of the spool; the whole being encased in a shell 18.

As shown in Fig. 1 the electromagnet assembly is held in tight abutment with the upper saddle member by the bolt 14 threaded into the shell and pole piece. An armature 19 associated with the electromagnet is formed with an upper portion 20 adapted to be slidably received within the axial bore of the coil spool and with a lower portion 21 of relatively smaller diameter adapted to be slidably received within a centrally located guide hole 22 in the lower saddle member. The air gap 23 or spacing between the armature 19 and the pole piece 17 as shown in Fig. 1 is maintained by a spring 24 which encompasses the upper portion 20 of the armature and which cooperates with a bi-position element actuator 25. The bi-position element actuator 25 is formed with a substantially rectangular body portion 26 having rectangular projections 27 of reduced width extending from the shorter dimensioned sides of the body portion. The body portion of the actuator is provided with a centrally located threaded hole 28 whereby the actuator may be threaded on the lower end of the armature in abutment with the shoulder 29 formed between the upper and lower portions of the armature. As is apparent the spring 24 mounted about the armature maintains the air gap 23 by urging the actuator 25 away from the electromagnet shell 18.

Rectangular printed circuit assembly switching units, generally designated by reference character 30 are adapted to be secured to the outer faces of the parallel mounting plates 10 and 11 as shown. Each of the switching units are identical in the embodiment illustrated and comprise a first rectangular printed circuit board 30 and a second rectangular printed circuit board 32.

The boards 31 and 32 of each unit are spaced in parallel planes and a predetermined distance apart by spacers 33 disposed across the shorter dimensioned ends of the printed circuit boards. Adapted for movement between the printed circuit boards 31 and 32 are bi-position elements 34.

Each of the bi-position elements 34 as seen in Fig. 4 comprises a rectangular board of predetermined thickness less than the thickness of spacers 33 and formed of any suitable insulating material. In the specific embodiment illustrated each element has a grid of 16 rectangular holes 35 formed therein and arranged in columns and rows. Each of the holes is adapted to receive a spring contact element 36 formed from a flat conductive strip so as to have a substantially elliptical cross section whose major axis length is greater than the thickness of the element 34. One side of the elliptically formed strips are cut and the ends 37 bent outwardly, as shown most clearly in Fig. 2. Each of the bi-position elements 34 is also provided with a relatively smaller rectangular hole 38 which is adapted to snugly receive the rectangular projections 27 of the actuator 25 mounted for movement with the armature 19.

As is apparent from Fig. 1 the parallel mounting plates 10 and 11 and the printed circuit boards 32 adjacent the parallel plates are provided with coincident rectangular holes 39 sufficiently vertically elongated to enable the actuator projections 27 to extend therethrough and to enable them to move vertically a distance at least equivalent to the air gap 23. As is apparent the switching units 30 are held together and secured to the parallel plates and saddle members by screws 40 or the like extending through appropriately positioned holes 41 in the printed circuit assemblies, mounting plates, and saddle members. When so assembled the spacing between printed circuit boards is such that the spring contact elements are compressed sufficiently to maintain good electrical contact with the printed circuit conductors thereon. Compression of the contact elements also causes the cut ends 37 to be urged against and to grip the walls of the rectangular holes 35.

In operation when the electromagnet is energized the armature 19 is attracted to the pole piece 17 against the force of spring 24. Movement of the armature carries the actuator 25 which in turn carries the bi-position elements 34. As is apparent from Figs 1 and 3 the length of each of the bi-position elements 34 disposed between the printed circuit boards is such that they may move from their home position abutting the lower spacers 33 upwardly toward the upper spacers 33, a distance at least equivalent to the air gap distance between pole piece and armature.

As may be seen from Figs. 5 and 6 the printed circuit boards 31 and 32 of a unit have complementary printed circuit patterns comprising a plurality of isolated printed conductors 43 which extend from the edges of the boards and terminate in different predetermined columnar positions i.e. columns A, B, C, D. As is apparent the contact areas 44 of the printed conductor terminations in columns A and C of board 31 are relatively larger than the contact areas 45 of the conductor terminations in columns B and D and the opposite is true of printed circuit board 32 such that when the printed circuit patterns face one another corresponding columnar positions are opposite with the large contact area conductor terminations 44 of the board 31 directly opposite and superimposed over two of the smaller contact area conductor terminations 45 on the other board 32 and vice versa. In the specific embodiment of the invention herein disclosed the conductor 43 having relatively larger contact area terminations 44 are adapted to be connected to power sources and the other conductors 43 on each board to utilization circuits. It is to be understood however, that power sources may be connected to conductors 43 having relatively small contact areas as well. In this instance output circuitry may be connected to the conductors 43 having relatively large contact area terminations.

As shown in Fig. 3 the columns of holes 35 wherein the spring contacts 36 are disposed are aligned with the printed conductor terminal columns A, B, C, D and thereby connect corresponding column positions on the two opposing printed circuit boards. When the bi-position element is in its home position as shown in Fig. 3 the transfer contacts 36 connect the relatively large contact area conductor terminations 44 on one board with the lower small contact area conductor terminations 45 of a pair of small contact area conductor terminations 45 associated therewith on the facing board and, after energization of the electromagnet and movement of the elements 34, the upper small contact area conductor terminations of a pair of small contact area terminations 45 with the large contact area terminations 44.

In accordance with the specific embodiment each board is provided with 16 output conductors making a total of 32 discrete output conductors per switching unit 30; 16 of which are normally on and 16 normally off. The arrangement is such that the 16 normally on circuits are broken before the 16 normally off circuits are made. Such contact arrangements are designated in the art as "Form C" contacts. Each switching unit 30 in the illustrative embodiment then, incorporates 32 "Form C" contacts in a small compact space whose size may be appreciated from the fact that the dimensions of the printed circuit boards are only 1.25" wide and 2.35" long.

The assembled unit as shown in Fig. 1 may be connected to external power and utilization circuits by inserting male units carrying the terminals of said external circuits into the open sides of the switching units 30 between the printed circuit boards whereby the circuit terminals will contact the printed circuit conductors 43 extending to the edges of the printed circuit cards.

It should be understood therefor, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A relay switching unit adapted to control a plurality of break, before make circuits simultaneously upon energization of an electromagnet comprising at least one pair of printed circuit boards, means for mounting said boards in spaced parallel relation, printed circuit conductor patterns on said boards facing each other, a bi-position element disposed between said boards, transfer contacts mounted on said bi-position element adapted to engage and interconnect first selected ones of opposite printed circuit conductors of said patterns when said element is in one of its two positions, and an armature coupled to said bi-position element adapted to move said element to the other of its two positions upon energization of said electromagnet whereby said transfer contacts slidably engage and interconnect second selected ones of opposite printed circuit conductors of said patterns.

2. A relay type switching device comprising a mounting frame, an electromagnet and armature supported by said frame, a plurality of isolated printed circuits on each of a pair of facing printed circuit boards, a bi-position switching element adapted for movement between said boards, contacts carried by said element compressed between said boards for selectively connecting energized ones of said isolated printed circuits on one of said boards with one or another of a pair of printed circuits on the other board of said pair and vice versa, and means connecting said element and armature.

3. A relay switching unit adapted to control a plurality of circuits simultaneously comprising, a supporting frame, an electromagnet and armature mounted on said frame, printed circuit asemblies mounted on said frame, each of said assemblies comprising a pair of printed circuit boards spaced in parallel relation and a bi-position element mounted for movement therebetween, printed circuit conductor patterns on the facing sides of said pairs of boards, the printed circuit conductors of said patterns terminating in predetermined columnar positions on said boards, said conductor terminations in alternate columnar positions having relatively large contact areas, said conductor terminations next adjacent said alternate columnar positions having relatively small contact areas, said pairs of boards being so mounted that conductor terminations of relatively large contact area on one board of a pair are directly opposite two conductor terminations of relatively small contact area on the other board of a pair, contacts mounted on said elements adapted to slidably engage and interconnect said large contact areas with one or another of opposite small contact areas depending on the position of said bi-position elements, and means coupling said elements and armature whereby upon energization and de-energization of said electromagnet said elements are moved from one to the other of their two positions.

4. A switching device comprising a pair of boards mounted in spaced parallel relation, a plurality of isolated printed circuit conductors on the facing sides of said boards extending from the edges of said boards whereby they may be connected to external circuitry and terminating at predetermined columnar positions whereby they may be selectively interconnected, said conductor terminations in alternate columnar positions having relatively large contact areas, said conductor terminations in columnar positions next adjacent alternate columnar positions having relatively small contact areas, said large contact area terminations on one board being opposite several of said small contact area terminations on the other board and vice versa, means mounted for movement between said boards from a first to a second position, a plurality of contact elements mounted on said means, said contact elements connecting said large contact area terminations with associated opposite first small contact area terminations in said first position and with associated opposite second small contact area terminations in said second position, and means for moving said movably mounted means.

5. A relay type switching device incorporating a plurality of break before make contacts comprising a mounting frame, an electromagnet and armature supported by said frame, a plurality of isolated printed circuits on each of a pair of printed circuit boards, a bi-position element adapted for movement between said boards, said element having a plurality of holes therein, spring contacts carried within said holes compressed between said boards for effecting contact between predetermined ones of said isolated printed circuits on one of said boards with one or another of a pair of printed circuits on the other board of said pair and vice versa, said contact elements being formed so as to grip said holes in said element when compressed between said boards, and means connecting said elements and armature.

References Cited in the file of this patent

UNITED STATES PATENTS

| | | |
|---|---|---|
| 1,393,822 | Parker | Oct. 18, 1921 |
| 1,956,422 | Hammerly | Apr. 24, 1934 |
| 1,981,987 | Bryce | Nov. 27, 1934 |
| 1,993,416 | Sachs | Mar. 5, 1935 |
| 2,136,612 | Dubuar | Nov. 15, 1938 |
| 2,616,994 | Luhn | Nov. 4, 1952 |
| 2,649,513 | Luhn | Aug. 18, 1953 |
| 2,776,348 | Korry | Jan. 1, 1957 |
| 2,870,274 | Thias | Jan. 20, 1959 |